United States Patent [19]

Olfert

[11] Patent Number: 4,522,120
[45] Date of Patent: Jun. 11, 1985

[54] BALE LENGTH CONTROLLING SPROCKET FOR BALING MACHINES

[76] Inventor: Abram J. Olfert, Box 7, Hague, Saskatchewan, Calif.X, S0K 1X0

[21] Appl. No.: 539,941
[22] Filed: Oct. 7, 1983
[30] Foreign Application Priority Data Oct. 7, 1982 [CA] Canada .................................. 413072

[51] Int. Cl.³ .............................................. B65B 13/26
[52] U.S. Cl. ............................................ 100/4; 100/43
[58] Field of Search ...................... 100/4, 8, 17, 20, 21, 100/22, 23, 43, 19 R

[56] References Cited

U.S. PATENT DOCUMENTS

| | | | |
|---|---|---|---|
| 2,576,784 | 11/1951 | Dodds | 100/43 |
| 2,720,159 | 10/1955 | Seltzer | 100/4 |
| 2,897,748 | 8/1959 | Nolt | 100/4 |
| 2,981,173 | 4/1961 | Nolt | 100/19 R |
| 3,221,639 | 12/1965 | Rimmey | 100/4 |
| 3,371,596 | 3/1968 | Nelson | 100/4 |

FOREIGN PATENT DOCUMENTS 57123  3/1946  Netherlands .......................... 100/43

Primary Examiner—Billy J. Wilhite
Attorney, Agent, or Firm—Stanley G. Ade

[57] ABSTRACT

The length of a bale is normally gauged by a fixed toothed wheel engaging the top of the bale. Therefore the height of the bale can effect the cut-off point so that bales can be of uneven length. This device utilizes a floating gauge wheel or star wheel which therefore rotates at a constant speed so that its actuation point is constant. It is connected to the knotting device which in turn controls the cut-off point of the bale being formed.

3 Claims, 7 Drawing Figures

BALE LENGTH CONTROLLING SPROCKET FOR BALING MACHINES

BACKGROUND OF THE INVENTION

This invention relates to new and useful improvements in baling machines and in particular, bale length controlling devices therefor.

Conventional baling machines for cubical bales, normally include a plunger assembly which gathers and injects wads of hay, straw or the like into the baling chamber thus forming a bale which is gradually ejected through the bale chute. At a predetermined point, the bale is knotted and cut off at a predetermined length.

Normally, a fixed, non-floating gauge wheel is provided with relatively long teeth extending from the periphery thereof. This is because the height of bales varies with the type of material being baled, the moisture content thereof and the like. The long teeth are necessary so that the wheel will always be in contact with the upper surface of the bale, but if a bale is relatively high then the teeth of the wheel, which is fixed to the chute, penetrate a greater distance than if the bale is of a standard height or perhaps of a lesser height. This varies the speed of rotation of the wheel and inasmuch as the number of rotations of the wheel are used to control the cut-off point, it will be apparent that bales of different lengths will be formed.

SUMMARY OF THE INVENTION

The present device overcomes these disadvantages by providing a floating star wheel which is maintained at a constant pressure upon the upper surface of the bale so that the speed of rotation thereof is constant. This star wheel is operatively connected to the conventional knotting device, the actuation of which automatically actuates the cut-off device which is also conventional.

An aspect of the invention is to provide in a baling machine which includes a bale discharge chute having an intake end and a discharge end, a bale knotting device and a cut-off device operatively connected to the knotting device and actuated thereby; means located in said chute for gauging the length of the bale prior to cutting off same, said means being operatively connected to the knotting device, said means comprising in combination a star wheel, means on said chute mounting said star wheel for contact with the upper surface of a bale being formed and passing through said chute, said means mounting said star wheel including further means to maintain substantially constant contact and pressure of said star wheel upon said upper surface of said bale and means actuated by said star wheel for measuring the rotation of said star wheel and further means operatively connecting said last mentioned means to the knotting device for actuating same.

A further aspect of the invention is to provide a baling machine comprising in combination a bale discharge chute having an intake end and a discharge end, a bale knotting device operatively connected thereto and a cut-off device operatively connected to said knotting device and actuated thereby, means located in said chute for gauging the length of said bale prior to cutting off same, said means being operatively connected to the knotting device, said means comprising in combination a star wheel, means on said chute mounting said star wheel for contact with the upper surface of a bale being formed and passing through said chute, said means mounting said star wheel including further means to maintain substantially constant contact and pressure of said star wheel upon said upper surface of said bale and means actuated by said star wheel for measuring the rotation of said star wheel and further means operatively connecting said last mentioned means to the knotting device for actuating same.

Another advantage of the invention is to provide a device which is readily attachable to existing baling machines.

A further advantage of the invention is to provide a device in which the length of the bales being formed may be controlled and varied within limits.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
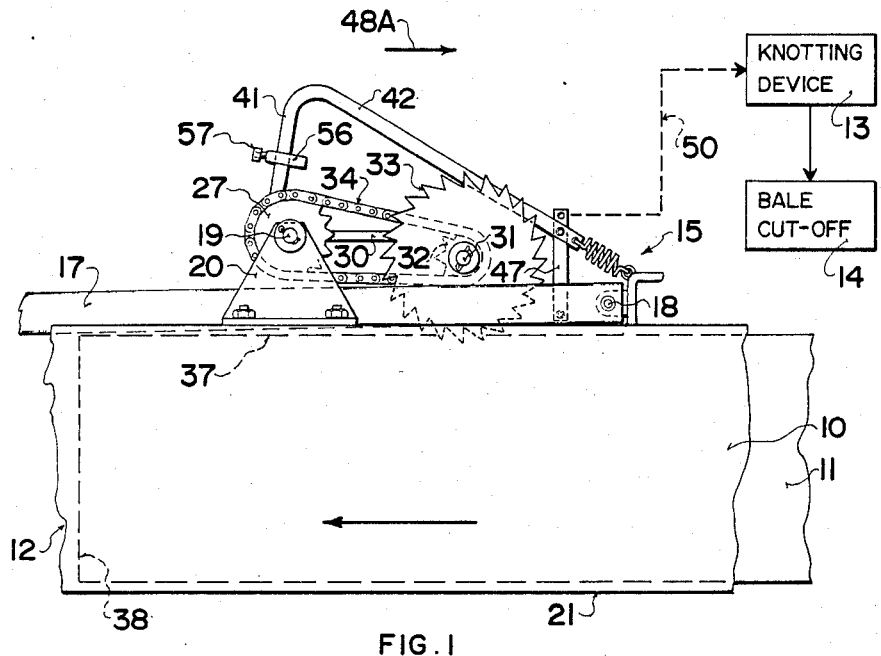
FIG. 1 is a side elevation of the bale discharge chute of a baling machine with the device in situ and showing the knotting device and bale cut-off device schematically.
Figure 2:
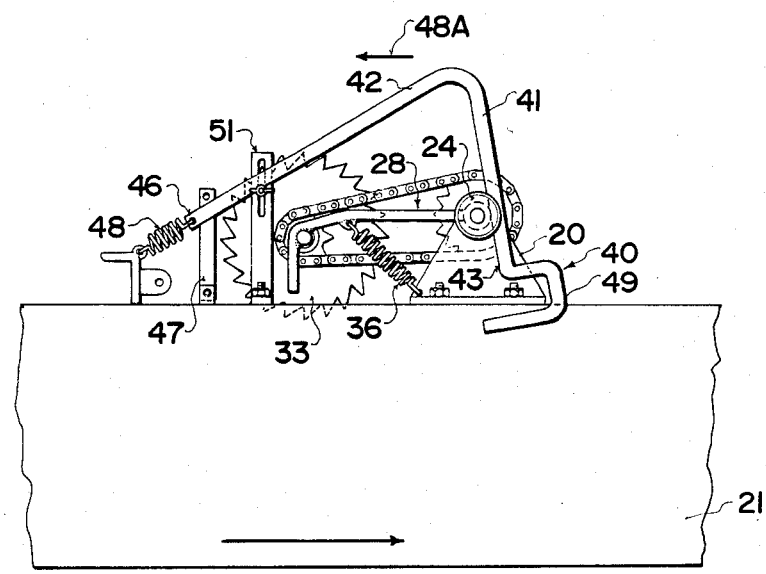
FIG. 2 is a view similar to FIG. 1, but taken from the opposite side thereof.
Figure 3:
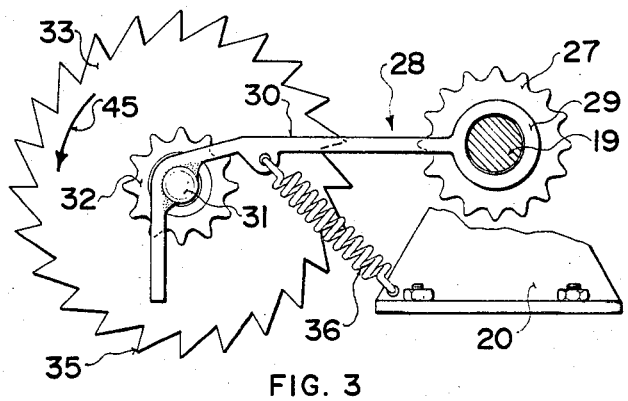
FIG. 3 is an enlarged fragmentary view of a portion of the gauge wheel and spring therefor.

Proceeding therefore to describe the invention in detail, reference character 10 illustrates in side elevation, a conventional bale discharge chute having an intake end 11 and a discharge end 12. This forms part of a conventional baling machine (not illustrated) but which includes a conventional knotting device shown schematically by reference character 13 which is operatively connected to a conventional bale cut-off device shown schematically by reference character 14. As these devices are conventional, it is not believed necessary to discuss further details thereof.

The invention collectively designated 15 is to control the length of the bale and to actuate the knotting device at the desired time which in turn automatically operates the bale cut-off device.

It is situated upon the upper side 16 of the bale discharge chute which includes a conventional pressure beam 17 pivoted adjacent the rear end as at 18 thereof and extending forwardly between the sides of the bale chute in a conventional manner.

A shaft 19 is journalled for rotation between two triangular brackets 20, one upon each upper side edge 20 of the bale chute sides 21 thus positioning the shaft above the pressure beam 17. The shaft is journalled within bearings 22 so that it may rotate and one end 23 is screw threaded as shown in FIG. 5. A pulley 24 engages this screw threaded end and is secured thereto by means of a nut and washer combination 26 (see FIG. 4).

A chain sprocket 27 is also secured to this shaft 19 intermediate the ends thereof and acts to rotate the shaft as will hereinafter be described.

A support bracket collectively designated 28 includes a bearing sleeve 29 which freely engages over shaft 19 which thereby supports same. A bracket portion 30 extends from the bearing sleeve 29 and terminates in a stub shaft 31 which is welded to the distal end of the bracket portion 30 and extends on one side thereof. A further sprocket 32 is freely mounted upon the stub shaft 31 and is secured to a star wheel 33 so that rotation of the star wheel rotates sprocket 32 and hence via a sprocket chain 34, sprocket 27.

The star wheel is provided with a plurality of equidistantly spaced projecting teeth 35 and a spring 36 reacts between the bracket portion 30 and one of the triangular brackets 20, to provide a constant downward pressure of the star wheel upon the upper surface 37 of a bale 38 which is being ejected from the bale chamber (not illustrated) and through the bale chute. This means that a constant pressure is maintained so that regardless of the height of the bale, the rotation of the star wheel is constant and is controlled by the ejection speed of the bales being formed.

Means are provided to measure the rotation of the star wheel and hence the length of bale being engaged thereby. This means takes the form of the aforementioned pulley 24 secured to shaft 19 and rotated by the star wheel 33 via the sprocket and chain assemblies 27, 32 and 34.

Figure 4:
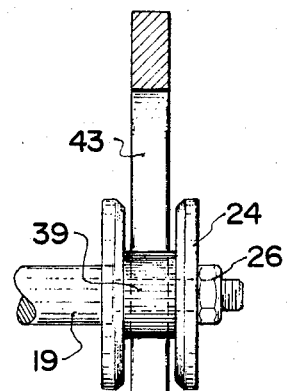
FIG. 4 is a fragmentary end elevation of the portion of the actuating lever and pulley engageable thereby.
Figure 5:
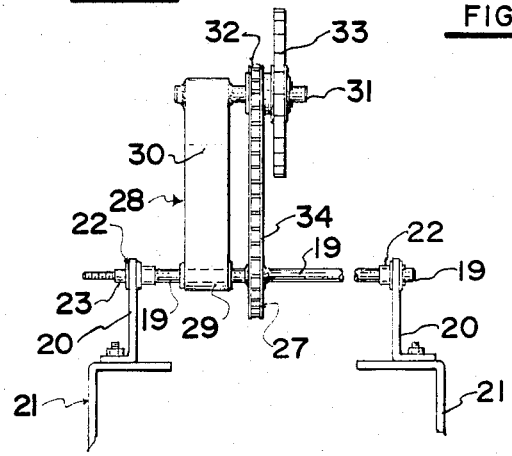
FIG. 5 is a fragmentary rear elevation of the device per se with the actuating lever removed.

The root surface 39 of the pulley 24 is horizontally serrated as shown in FIG. 4 and an actuating lever collectively designated 40 engages this surface. The actuating lever includes the substantially vertical portion 41 and a mounting portion 42 extending forwardly and downwardly therefrom. The front surface 43 of the substantially vertical portion 41 engages the serrations 39 so that rotation of the shaft, by the star wheel, in the direction of arrow 45, causes the pulley to move the actuating lever upwardly as will hereinafter be described. The front end 46 of the portion 42 of the actuating lever is pivoted upon a lever 47 supported on one side of the chute and a small spring 48 extends between the end 46 and the chute and urges the actuating lever in the direction of arrow 48. It also maintains engagement of the edge 44 with the serrated root surface 39 of the pulley 24.

A recessed portion 49 is formed on the lower end portion of the vertical portion 41 of the lever and as the lever is elevated around the pivot mounting of the front end thereof, this recessed portion engages the root of the pulley 24 with spring 48 end shifting the lever in the direction of arrow 48. This lever is operatively connected to the knotting device by linkage indicated by reference character 50 so that when it end shifts, the knotting device is actuated which in turn actuates the bale cut-off device and severs the bale from the continuous bale being ejected into the bale chute. Inasmuch as the star wheel maintains a constant pressure upon the surface of the bale, it rotates at a constant speed so that the length of the bales being formed is also constant.

Figure 6:
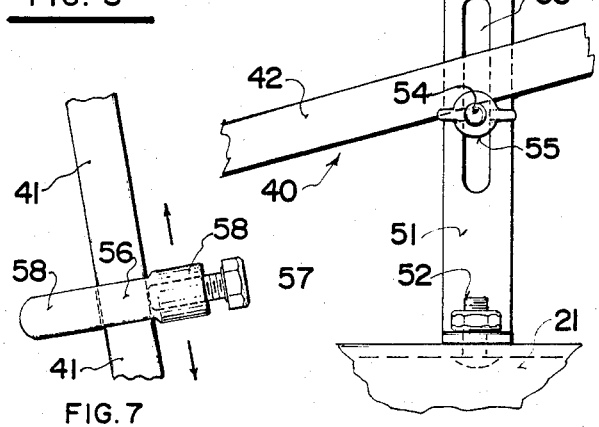
FIG. 6 is a fragmentary side elevation of the actuating lever showing the adjustment means therefor.

Means are provided to control this length within limits and one such structure is shown in FIG. 6. A standard 51 is secured by the lower end thereof to the upper edge of one side 21 of the bale chamber by means of nut and bolt assembly 52. A vertically situated closed ended slot 53 is formed within the standard and a pin 54 is mounted for vertical movement within the slot and extends from one side thereof. This pin is clamped in position by means of a wing nut and screw threaded bolt 55 which extends from the pin. The mounting portion 42 of the arm 40 rests upon this pin so that the beginning of the "vertical stroke" can be preset by positioning the pin within the slot.

Figure 7:
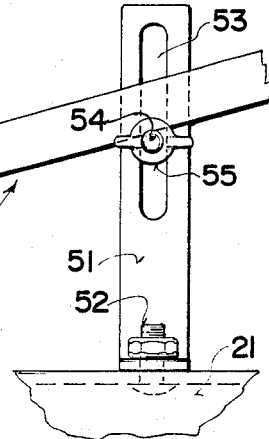
FIG. 7 is an enlarged fragmentary side elevation of an alternative adjustment means.

The preferred adjustment means is shown in FIGS. 1 and 7 and includes an apertured member 56 slidably engageable over the vertical portion 41 of the actuating lever 40, being detachably clamped along the length of the portion 41 by means of clamp bolt 57 screw threadably engaging one end 58 of the member 56. The other end 58 of the member 56 extends and engages the adjacent triangular bracket 20 to limit the downward movement of the lever and hence control the distance the lever must elevate in order to actuate the knotting device and hence the bale cut-off mechanism.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a baling machine which includes a bale discharge chute having an intake end and a discharge end, a bale knotting device and cutoff device operatively connected to the knotting device and actuated thereby; the improvement comprising a star wheel located in said chute for gauging the length of the bale prior to cutting off same, said star wheel being operatively connected to the knotting device, means on said chute mounting said star wheel for floating contact with the upper surface of a bale being formed and passing through said chute, said means including further means to maintain substantially constant contact and pressure of said star wheel upon said upper surface of said bale, said means mounting said star wheel and said further means to maintain substantially constant contact and pressure of said star wheel including a mounting bracket, a shaft supported upon said chute and extending transversely thereacross for pivotally supporting said mounting bracket by one end thereof to the upper side of said chute and extending longitudinally of said chute towards the discharge end thereof, means mounting said star wheel for free rotation adjacent the distal end of said bracket, spring means reacting between said bracket and said chute to maintain a relatively constant downward pressure of said star wheel when engaging the upper surface of said bale, means actuated by said star wheel for measuring the rotation of said star wheel and further means operatively connecting said last mentioned means to the knotting device for actuating same, said means actuated by said star wheel for measuring the rotation thereof, including a chain and sprocket assembly operatively extending between said star wheel and said shaft, to rotate said shaft, a pulley secured to said shaft, said pulley having a root surface, the root surface of said pulley being serrated, an actuated lever mounted upon said chute, said lever including a substantially vertical portion having an edge engageable with the serrated root surface of said pulley and a mounting portion extending from the upper end of said substantially vertical portion, means to maintain the engagement of said edge of said substantially vertical portion, with the serrated root surface of said pulley, a recessed portion formed on the lower end of said substantially vertical portion engaging with said root surface of said pulley when said recessed portion reaches said pulley thereby end shifting said actuating lever, means pivotally mounting said actuating lever adjacent the distal end of said mounting portion of said end shifting of said actuating lever, said knotting device being actuated when said recessed portion of said actuating lever engages said pulley, and means to adjust the initial position of said substantially vertical portion relative to said pulley to control the timing of the engagement of said recessed portion with said pulley and hence the timing of the actuation of said knotting device and hence the actuation of said knotting device.

2. The device according to claim 1 in which said means to adjust the initial position of said substantially vertical portion includes a standard extending upwardly from said chute, a substantially vertical, closed ended slot formed in said standard, an adjustably positioned support pin extending from said slot and means to adjust the position of said pin along the length of said slot, said mounting portion of said actuating lever resting upon said pin.

3. The baling machine according to claim 1 in which said means to adjust the initial position of said substantially vertical portion includes an apertured member slidably mounted upon said substantially vertical portion for adjustment therealong, clamp means operatively engaging said member to selectively secure said member upon said vertical portion and means on said machine engaged by said member when said substantially vertical portion is in the said initial position.

* * * * *